(12) United States Patent
Jürs et al.

(10) Patent No.: US 11,006,645 B2
(45) Date of Patent: May 18, 2021

(54) APPARATUS FOR CUTTING FISH FILLETS FROM FLANK BONES, FILLETING APPARATUS WITH SUCH AN APPARATUS, AND METHOD FOR CUTTING FISH FILLETS FROM FLANK BONES

(71) Applicant: NORDISCHER MASCHINENBAU RUD. BAADER GMBH + CO. KG, Lübeck (DE)

(72) Inventors: Michael Jürs, Neustadt (DE); Matthias Schroeder, Badendorf (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/617,041

(22) PCT Filed: May 29, 2018

(86) PCT No.: PCT/EP2018/064005
§ 371 (c)(1),
(2) Date: Nov. 26, 2019

(87) PCT Pub. No.: WO2018/219907
PCT Pub. Date: Dec. 6, 2018

(65) Prior Publication Data
US 2020/0329723 A1 Oct. 22, 2020

(30) Foreign Application Priority Data
May 29, 2017 (EP) .................................... 17173278

(51) Int. Cl.
*A22C 25/00* (2006.01)
*A22C 25/18* (2006.01)
*A22C 25/08* (2006.01)

(52) U.S. Cl.
CPC .............. *A22C 25/18* (2013.01); *A22C 25/08* (2013.01)

(58) Field of Classification Search
CPC ......... A22C 25/00; A22C 25/08; A22C 25/14; A22C 25/145; A22C 25/16; A22C 25/18
(Continued)

(56) References Cited

U.S. PATENT DOCUMENTS 4,151,629 A * 5/1979 Braeger .................. A22C 25/16
452/121
4,336,634 A * 6/1982 Braeger .................. A22C 25/16
452/135

(Continued)

FOREIGN PATENT DOCUMENTS

WO 2014/170163 10/2014
WO 2016/091572 6/2016

OTHER PUBLICATIONS

Int'l Search Report (Form PCT/ISA/210) conducted in Int'l Appln. No. PCT/EP2018/064005 (dated Jun. 22, 2018).
(Continued)

*Primary Examiner* — Richard T Price, Jr.
(74) *Attorney, Agent, or Firm* — Greenblum & Bernstein, P.L.C.

(57) ABSTRACT

Filleting apparatus for cutting fish fillets from flank bones. The fish fillets been processed by a ventral knife assembly and a dorsal knife assembly. A conveying apparatus, transporting fish tail-first in transport direction, having an endlessly circulating transport conveyor with at least one transport saddle receiving/securing a fish, a flank knife assembly with two flank knife units, opposing each other on both sides of the transport conveyor in the region of a transport saddle guide. Each flank knife unit has a rotatably drivable circular knife and counter-surface arrangement Circular knife is arranged at a distance from the counter-surface arrangement
(Continued)

Figure 1:
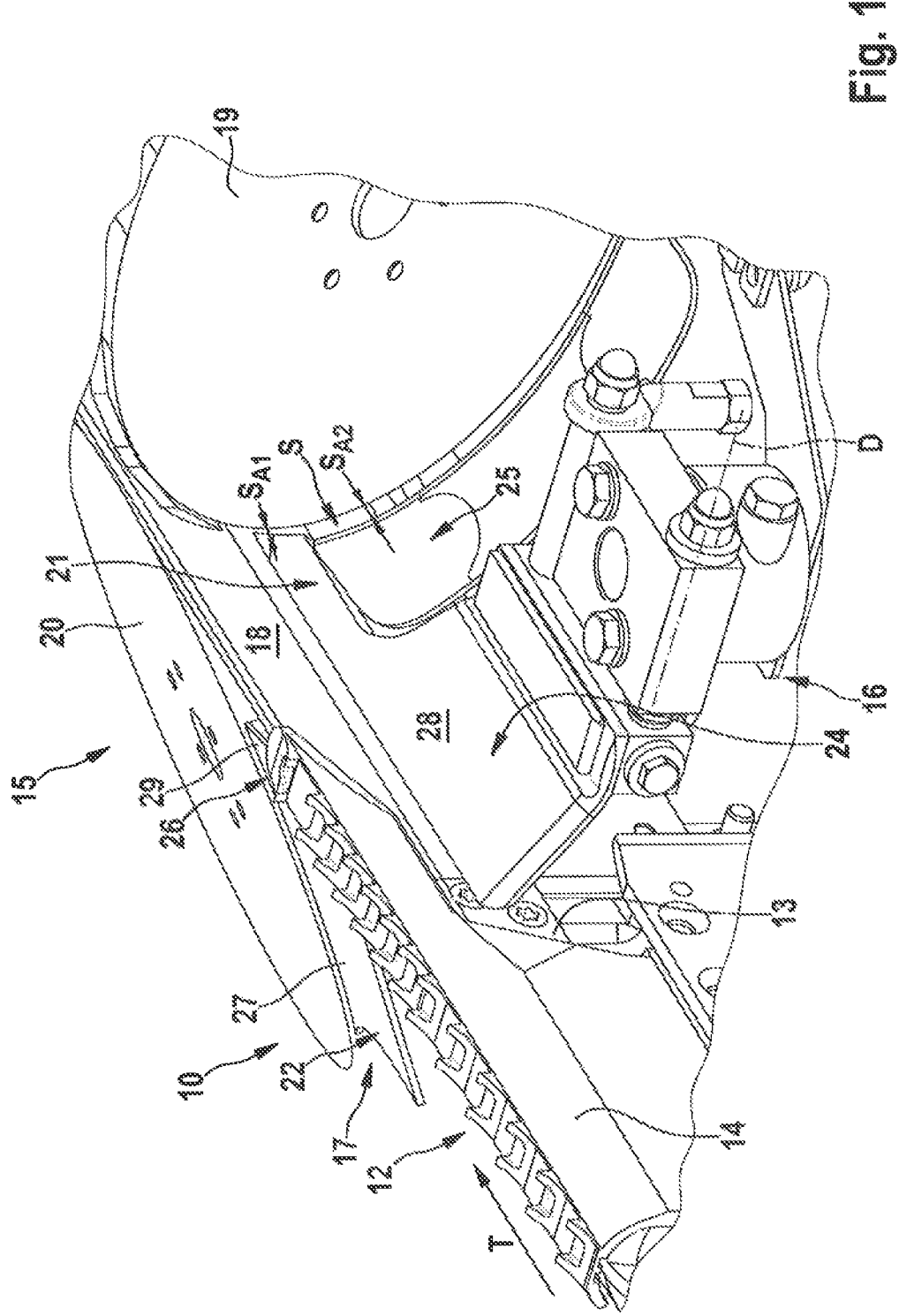

to form a cutting gap and a control device moves flank knife units relative to the transport conveyor from standby position into working position and back. The counter-surface arrangements vary the size of the cutting gap controllably during the processing operation.

19 Claims, 7 Drawing Sheets

(58) Field of Classification Search
USPC ......... 452/149, 150–153, 155–157, 160–162
See application file for complete search history.

(56) References Cited

U.S. PATENT DOCUMENTS

| | | | | | |
|---|---|---|---|---|---|
| 5,167,570 | A | * | 12/1992 | Ryan | A22C 25/16 452/160 |
| 5,482,502 | A | * | 1/1996 | Hjorth | A22C 25/16 452/162 |
| 5,536,205 | A | * | 7/1996 | Braeger | A22C 25/16 452/161 |
| 6,604,991 | B1 | * | 8/2003 | Jurs | B26D 5/00 452/150 |
| 8,272,928 | B2 | * | 9/2012 | Finke | A22C 25/16 452/161 |
| 8,298,050 | B2 | * | 10/2012 | Jurs | A22C 25/16 452/162 |
| 8,814,637 | B2 | * | 8/2014 | Jurs | A22C 25/16 452/162 |
| 9,532,582 | B2 | | 1/2017 | Jurs et al. | |
| 10,368,554 | B2 | | 8/2019 | Jurs | |
| 2010/0255767 | A1 | | 10/2010 | Juers et al. | |
| 2016/0073647 | A1 | | 3/2016 | Jurs et al. | |
| 2018/0263250 | A1 | | 9/2018 | Jurs | |

OTHER PUBLICATIONS

Int'l Written Opinion (Form PCT/ISA/237) conducted in Int'l Appln. No. PCT/EP2018/064005 (dated Jun. 22, 2018) (w/ English translation).

European Office Action conducted in Europe Appln. No. 17 173 278.7 (dated Oct. 25, 2019).

* cited by examiner

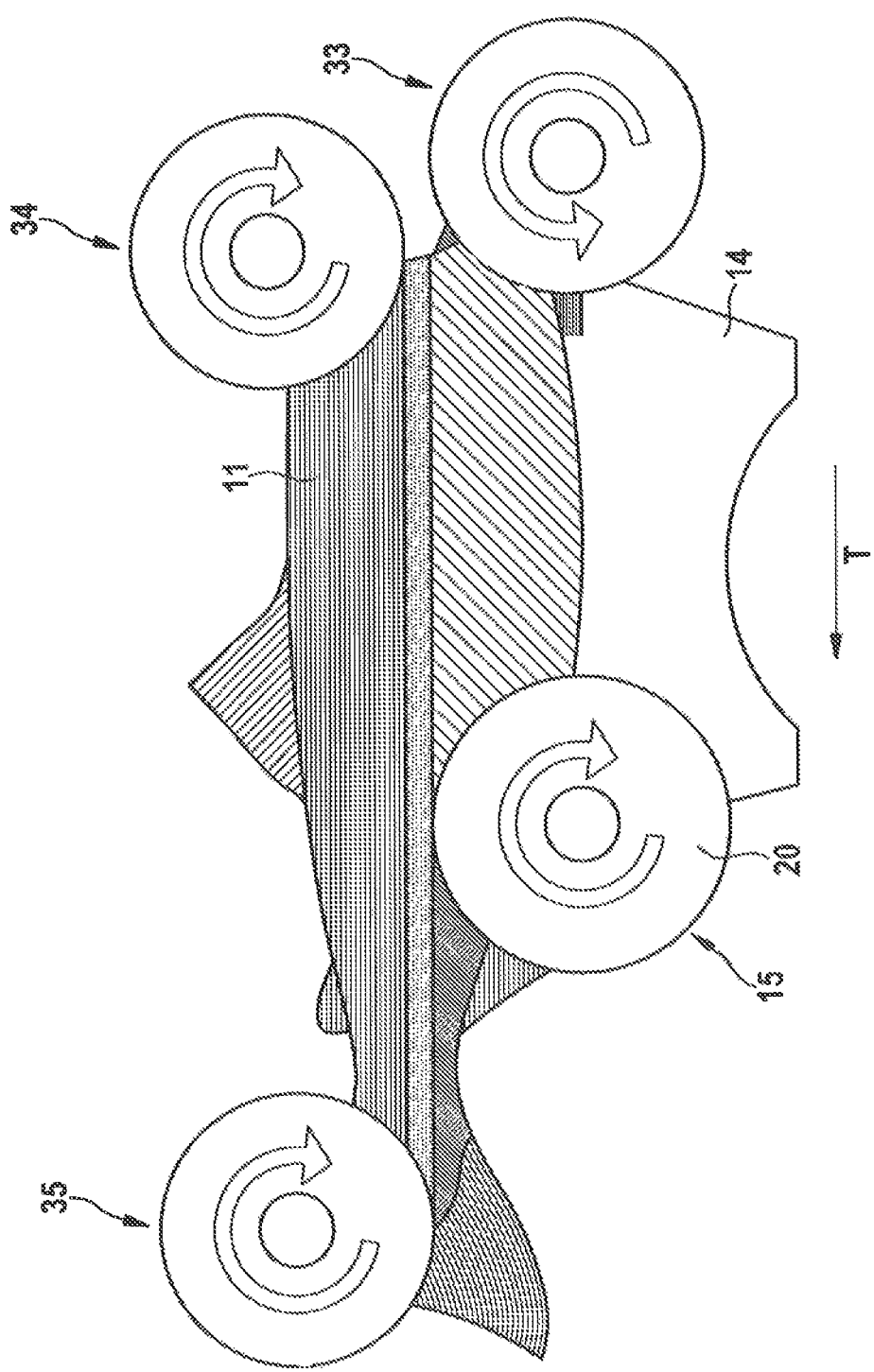

APPARATUS FOR CUTTING FISH FILLETS FROM FLANK BONES, FILLETING APPARATUS WITH SUCH AN APPARATUS, AND METHOD FOR CUTTING FISH FILLETS FROM FLANK BONES

The invention relates to an apparatus, designed and configured for processing headed fish, namely for cutting the fish fillets of the fish, which preferably have already been processed by a ventral knife assembly and a dorsal knife assembly, from the flank bones, comprising a conveying apparatus, designed and configured for transporting the fish tail-first in transport direction T, the conveying apparatus having an endlessly circulating transport conveyor with at least one transport saddle for receiving and securing a fish, a flank knife assembly, said flank knife assembly having two flank knife units, opposing each other on both sides of the transport conveyor in the region of a transport saddle guide, and each flank knife unit comprising a rotatably drivable circular knife as well as a counter-surface arrangement for the circular knife, said circular knife being arranged at a distance from the counter-surface arrangement to form a cutting gap, as well as at least one control device for moving the flank knife units relative to the transport conveyor from a standby position into a working position and back.

The invention additionally relates to a filleting apparatus, designed and configured for completely separating the fish fillets from headed fish.

The invention also concerns a method for processing headed fish, namely for cutting the fish fillets of the fish, which preferably have already been processed by a ventral knife assembly and a dorsal knife assembly, from the flank bones, comprising the steps: feeding headed fish tail-first by means of a conveying apparatus comprising a transport conveyor along a transport path in transport direction T into the region of a flank knife assembly, wherein the flank knife assembly comprises two flank knife units which are situated on opposing sides of the transport conveyor, moving the flank knife units relative to the transport conveyor from a standby position into a working position when the fish reach the region of the flank knife units with the leading end of their abdominal cavity, cutting the fish fillets from the flank bones on both sides of the transport path by means of one flank knife unit in each case, the flank bones being guided through a cutting gap S formed between a rotatably drivable circular knife and a counter-surface arrangement of the flank knife units.

Such apparatuses and methods are used in the fish processing industry to process headed and preferably also gutted fish. Processing of the fish usually comprises a plurality of processing steps at a plurality of processing stations. After the fish have been headed, they are placed on a transport saddle as part of a conveying apparatus. For this purpose, the fish is placed onto the transport saddle with the abdominal cavity preferably opened, a tip of the transport saddle leading in transport direction T being situated in the region of the end of the abdominal cavity directed towards the tail side, that is to say approximately in the region of the anus of the fish. The fish received and secured on the transport saddle are then transported tail-first along the different processing stations in such a manner that the processing stations come into engagement with the fish. To completely remove the fish fillets from the skeleton of the headed fish, ventral and dorsal incisions are preferably made first. For this purpose, an appropriate filleting apparatus comprises a ventral knife assembly and a dorsal knife assembly.

A dorsal incision is made with the dorsal knife assembly. The dorsal knife assembly comprises, for example, two circular knives arranged substantially parallel or slightly inclined to each other and at a distance from each other which make a continuous dorsal incision starting from the tail in the direction of the (no longer present) head over the entire length of the fish. A ventral incision is made with the ventral knife assembly. The ventral knife assembly comprises, for example, two circular knives arranged substantially parallel or slightly inclined to each other and at a distance from each other which make a ventral incision starting from the tail end up to the tail-side beginning of the abdominal cavity. Then the ventral knife assembly inserts with the circular knives into the abdominal cavity.

After the ventral and dorsal incision, the fish fillets, the flank regions of which are also referred to as belly flaps, continue to be connected to the flank bones (also called rib bones) on the skeleton. In other words, the fish fillets (consisting of flesh and outer skin) on both sides of the skeleton still rest on the flank bones and are connected thereto. The apparatus for cutting the fish fillets, which preferably have already been processed by the ventral knife assembly and the dorsal knife assembly (which is appropriately also referred to as a flank cutter), is used to detach or separate the fish fillets from the flank bones, which is also referred to as flank cutting. Known flank cutters have the features of the preamble of claim 1.

The flank knife assembly comprises two flank knife units, each of which has one circular knife. The two circular knives are arranged on opposing sides of the conveying apparatus or the transport conveyor and inclined at an angle to each other in such a manner that they are each directed sloping laterally downwards starting from a central guide, namely the transport saddle guide, for the transport saddle. The circular knives can be rotatably driven via a common drive or via individual drives. The flank knife units have a counter-surface arrangement for each circular knife, which forms a counter-surface or support surface for the circular knives during the cutting process. When flank cutting, the flank bones are situated above the counter-surface arrangements. The counter-surface arrangements thus form a support surface on both sides of the transport conveyor for the flank bones, with the fish fillets connected externally to the flank bones. The counter-surface arrangements "force" the flank bones into a substantially horizontal orientation or into an orientation which corresponds to the inclination of the circular knives. For flank cutting, the circular knives penetrate the fish at about the level of the anus (i.e. on the tail-side end of the abdominal cavity), namely between the flank bones and the fish fillet, whereby the fish fillet is detached from the flank bones. A high-yield incision is made by closely guiding the circular knives on the flank bones.

By means of the or each control device, the flank knife units can be moved separately or together from the standby position, in which the circular knives are out of engagement with the fish or the operating area of the circular knives is outside the transport path of the fish, into the working position, in which the circular knives are in engagement with the fish or the operating area of the circular knives is in the transport path, and back again such that the fish necessarily pass through the operating area during transport along the transport path. On the one hand, in the standby position, the circular knives are located in recesses of the central transport saddle guide so that the cutting edges of the circular knives are covered. On the other hand, in the standby position, the circular knives are below the counter-surface arrangement so that the cutting edges are also covered by said counter-surface arrangements. In the working position, which is offset vertically upwards to the standby position, the circular knives with their cutting edges are moved out of the recesses of the central transport saddle guide so that the knives are ready for use. Due to the flank knife units moving vertically upwards, the cutting edges of the circular knives are also positioned above the counter-surface arrangement, that is with a gap to the counter-surface arrangement. This distance defines the cutting gap S. The cutting gap S or the size thereof determines the cutting thickness as well as the appropriate time for the circular knife to engage in the fish. The distance or the size of the cutting gap S is basically adjustable, but only when the apparatus is stationary and has been disabled. Once set, the size of the cutting gap S between the counter-surface arrangement and the circular knives is fixed for the processing operation. This results in a constant cutting thickness (resembling a plane) during the entire processing operation.

The separating assembly severs any (residual) connections of the fish fillets to the skeleton that still remain so that the fish fillets, completely separated from the skeleton, fall away from it laterally and can be transported onwards and processed.

As indicated, the fish fillets, i.e. the fillet flesh with the outer skin side, always run along above the circular knives during flank cutting, while the flank bones run along below the circular knives through the cutting gap S. Many fish species, particularly those from the salmon family and white fish, have ventral fins arranged in pairs also known as pelvic fins) which lie on the ventral side between the anus and the head end of the fish. The distance between the ventral fins and the anus is substantially constant regardless of the size of the fish. The anus or the position thereof has a fixed reference to the leading tip of the transport saddle. The belly flaps, i.e. the fish fillets with their ventral fins still on the flank bones, basically hang down laterally from the transport saddle and in the region of the counter-surface arrangements rest thereon so that they lie in a substantially horizontal orientation or in an orientation which corresponds to the orientation of the circular knives.

Cutting with a continuously constant cutting thickness or constant cutting gap, as with the known apparatus described above, along the ventral side of the entire fish results in the ventral fins remaining on the fish fillet, as the circular knives are guided along between the flank bones and the flesh of the fish fillet. In other words, the fish fillets (with the ventral fins) which are already separated from the flank bones slide along and above the circular knives. This means that individual fish fillets, on which the ventral fins are still completely or partially present, have to be reworked, usually manually. Such additional, and also above all, manual reworking results in increased expenditure and thus to increased costs.

Thus, the object of the invention is to create an improved and simple apparatus for flank cutting by means of which the fish fillets, free of ventral fins, can be removed from the skeleton. The object further consists of creating a corresponding filleting apparatus. The object also consists of proposing a corresponding method.

This object is achieved by an apparatus with the features referred to hereinbefore in that the counter-surface arrangements are designed and configured to vary the size of the cutting gap controllably during the processing operation, With this embodiment according to the invention, it is achieved that the size of the cutting gap can be varied at suitable positions and at the specified time. In other words, the counter-surface arrangements can automatically be moved downwards by active control shortly before the fish reach the circular knives with their ventral fins. As a result, there is no support for the belly flaps. Due to the lack of support, the belly flaps (with the ventral fins) fold down by gravity alone so that the circular knives, which were previously dipped into the fish from below and inside (between the fish fillet flesh and the flank bones) in order to separate the fish fillets from the skeleton, now cut from inside through the skin of the fish fillets to outside. In other words, the belly flaps with the ventral fins dip into the cutting gap below the circular knives, Everything that is guided along below the circular knives remains on the skeleton. Everything that is guided along above the circular knives is cut away from the skeleton as a fish fillet. As soon as the fish have passed the circular knives with their ventral fins, the counter-surface arrangements can be moved upwards again by the control so that the belly flaps are supported again and the original cutting gap is established in order to guide the circular knives as closely as possible along the flank bones. The result of cutting is yield-optimised fish fillets which are free from ventral fins and remnants of ventral fins. In other words, the ventral fins are still attached to the skeleton, while the fish fillets, which are completely separated from the skeleton, have a corresponding cut-out in the region where the ventral fins were located.

A particular advantage is achieved by the embodiment according to the invention in that the counter-surface arrangements are associated with at least one control device for moving the counter-surface arrangement relative to the circular knife in such a manner that the counter-surface arrangements are designed to be movable, at least section by section, relative to the respective circular knife of the flank knife units for varying the size of the cutting gap during the processing operation. Due to this section by section control or movement of the counter-surface arrangements, the belly flaps are supported during the entire processing operation on the one hand and are temporarily and partially released to omit the ventral fins on the other hand so that the belly flaps with the ventral fins can be guided under the circular knife.

Advantageously, each counter-surface arrangement comprises at least two separate counter-surface elements, of which a first counter-surface element is arranged on the flank knife unit at a fixed gap distance from the circular knife, forming a cutting gap, and movable against a spring force, and the second counter-surface element is arranged on the flank knife unit so as to be separately controllable and movable towards the circular knife and away from the circular knife for varying the size of a gap distance, forming a cutting gap. The division of the counter-surface arrangement into two separate counter-surface elements simplifies and facilitates the section by section control and movement of the counter-surface arrangements and ensures that, despite the increase in the cutting gap in one partial region, there is sufficient support in the other partial region.

In a preferred embodiment of the invention, the first counter-surface element has a substantially rectangular support surface, a corner region of the support surface being recessed in a region of the first counter-surface element, which is at the rear in transport direction T, on the side directed away from the transport conveyor, and the second substantially crescent-shaped counter-surface element is arranged in the region of this recess. Both counter-surface elements form a cutting gap from the circular knife. The size of the cutting gap between the first counter-surface element and the circular knife is basically constant, with the exception of the deflection against the spring force caused by the fish. The size of the cutting gap between the second counter-surface element and the circular knife is variable, depending on which area of the fish is currently in the region of the circular knife. No later than when the ventral fins reach the circular knives, the cutting gap between the second counter-surface arrangement and the circular knives is increased by lowering the second counter-surface element in relation to the circular knife.

An especially preferred embodiment of the invention is characterised in that each flank knife unit is associated with a cam control, by means of which the flank knife units can be moved from the standby position into the working position and vice versa, and in that each counter-surface arrangement is associated with a cam control, by means of which the counter-surface arrangement can be moved, at least section by section, relative to the circular knife, it being possible to superimpose the movements of the flank knife units and the counter-surface arrangements on each other. The cam control of the flank knife units is designed and configured in such a manner that, to transfer the flank knife units from the standby position into the working position, first the circular knives are moved upwards relative to the counter-surface arrangements so that the cutting edges of the circular knives are above the counter-surface arrangement, and the entire flank knife units with the circular knives and the counter-surface arrangements are moved upwards with a time delay. The movements take place in reverse order when transferring the flank knife units from the working position into the standby position. The counter-surface arrangements are controlled in the working position relative to the circular knives and are moved downwards and upwards again with the cam control which is associated with each counter-surface arrangement. This ensures simply designed and precise control of the counter-surface arrangements during the processing operation. The two flank knife units may be controllable via a common cam control or via separate cam controls. The same applies to the counter-surface arrangements.

Particularly advantageously, the second counter-surface element is associated with a cam control in such a manner that the second counter-surface element can be moved, in particular can be pivoted, from a first position, in which the second counter-surface element substantially fills the recess of the first counter-surface element and the sizes of the cutting gaps between the first counter-surface element and the circular knife and the second counter-surface element and the circular knife are substantially identical, into a second position, in which the second counter-surface element uncovers the recess of the first counter-surface element and increases the cutting gap between the second counter-surface element and the circular knife, and vice versa. This reduces the mass to be moved. In addition, the section in which the size of the cutting gap is to be temporarily increased can be kept as small as possible so that the ventral fins can be evaded with minimum loss of yield.

In an alternative embodiment, each flank knife unit is associated with a cam control, by means of which the flank knife units can be moved from the standby position into the working position and vice versa, and each counter-surface arrangement is associated with an electrically controllable drive means, by means of which the counter-surface arrangement can be moved, at least section by section, relative to the circular knife, it being possible to superimpose the movements of the flank knife units and the counter-surface arrangements on each other. The electrically controllable drive means ensures particularly precise and above all timely control of the counter-surface arrangements.

Advantageously, the second counter surface element is associated with a pneumatic cylinder in such a manner that the second counter-surface element can be moved, in particular can be moved linearly, from a first position, in which the second counter-surface element substantially fills the recess of the first counter-surface element and the sizes of the cutting gaps between the first counter-surface element and the circular knife and the second counter-surface element and the circular knife are substantially identical, into a second position, in which the second counter-surface element uncovers the recess of the first counter-surface element and increases the cutting gap between the second counter-surface element and the circular knife, and vice versa, the pneumatic cylinder being connected to a control device. Due to this particularly preferred embodiment, it is possible to achieve the advantages of precise and time-optimised control in a particularly easy manner.

In a further alternative development, both the counter-surface arrangements and the flank knife units are associated with drives for adjusting the position, the drives being connected to a control device via electrical connections. Due to this particularly preferred embodiment, the advantages of precise and time-optimised control can be achieved in a particularly easy manner.

Advantageously, the control device includes at least one control program, by means of which the flank knife units can be moved, during the processing operation, between their positions and/or each counter-surface arrangement or counter-surface elements thereof, away from the circular knife for increasing the gap distance from the circular knife, which forms the cutting gap, and towards the circular knife for decreasing the distance from the circular knife. Electrical control of all movements of the flank knife units and the counter-surface arrangements enables the apparatus to function in a coordinated and precise manner.

The object is also achieved by the filleting apparatus referred to hereinbefore, which is characterised by an apparatus according to one or more of claims 1 to 10, a ventral knife assembly for processing the ventral side of the headed fish from the tail to the anus region of the fish as well as a dorsal knife assembly for processing the dorsal side of the headed fish over their entire length, the ventral knife assembly and the dorsal knife assembly each being arranged upstream of the flank knife assembly in transport direction T, and a separating assembly for completely separating the fish fillets from the skeleton of the headed fish, the separating assembly being arranged downstream of the flank knife assembly in transport direction T, as well as a control device for controlling the filleting apparatus. The advantages arising from this have already been described in detail in connection with the apparatus for flank cutting, which is why reference will be made to the relevant passages to avoid repetitions. According to the invention, such filleting machines, which are also referred to as saddle filleting machines, are able to also perform an automated fin incision for the first time.

The object is also achieved by a method with the steps referred to hereinbefore, in that the counter-surface arrangements are lowered at least section by section for temporarily increasing the cutting gap S during cutting of the fish fillets from the flank bones and are then raised again. Instead of a substantially straight separating incision, an individual cutting line can be produced by means of the procedure according to the invention so that the region of the ventral fins can be evaded during cutting. As a result, the ventral fins remain on the skeleton, while the fish fillets have a cut-out in the region where the ventral fins were located. In other words, the method according to the invention enables a targeted incision in which the ventral fins are "bypassed". Basically, the skin and flesh of the fish fillet/belly flap run along above the circular knife, while the flank bones are guided through the cutting gap S below the circular knife. By lowering the counter-surface arrangements, sufficient space is created so that the belly flap with the ventral fins can fold downwards by gravity. As a result, the belly flaps with the ventral fins are guided through the increased cutting gap below the circular knife. In other words, the circular knife cuts briefly from inside through the skin to the outside when the counter-surface arrangements are lowered. As a result, the belly flaps with the ventral fins are guided along below the circular knife until the counter-surface arrangements are steered upwards again, the circular knife then cutting from outside through the skin to the inside so that skin and flesh then run completely above the circular knife again, while the flank bones are guided through the cutting gap S below the circular knife.

Advantageously, the counter-surface arrangements each comprise two counter-surface elements, first counter-surface elements of both counter-surface arrangements forming a fixed gap distance $S_{A1}$ from the circular knife, and second counter-surface elements of both counter-surface arrangements being separately controlled in such a manner that the gap distance $S_{A2}$ from the circular knife varies and in particular increases when the fish reach the circular knives of the flank knife units with their ventral fins.

A preferred development is characterised in that the fish are processed by means of a ventral knife assembly and a dorsal knife assembly before flank cutting, and in that the fish are detached completely from the skeleton by means of a separating assembly after flank cutting.

Especially preferably, the method is carried out using a filleting apparatus according to claim 11.

To describe the advantages, reference will be made to the statements regarding the apparatus for flank cutting to avoid repetitions.

Figure 2:
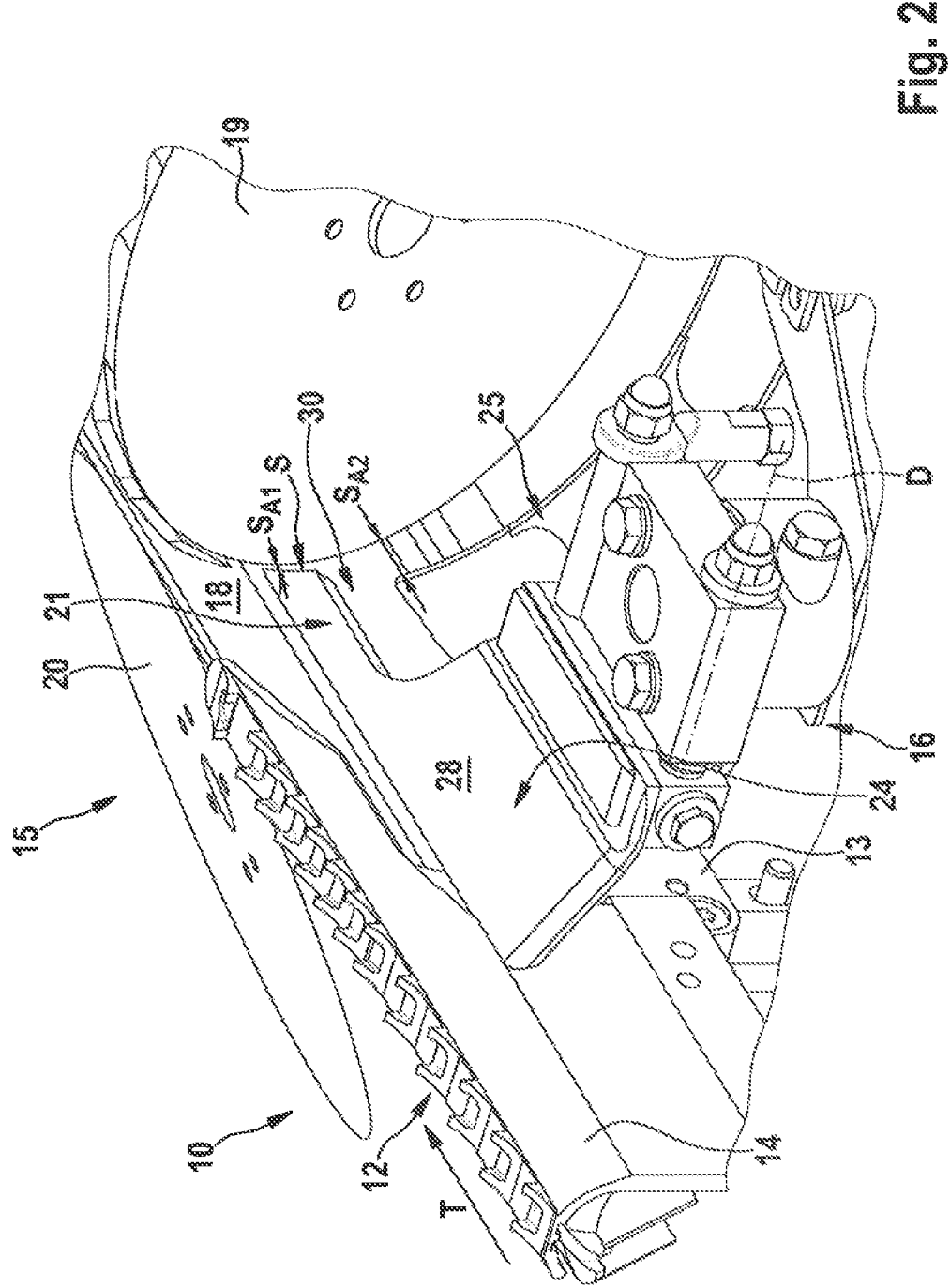
Figure 3:
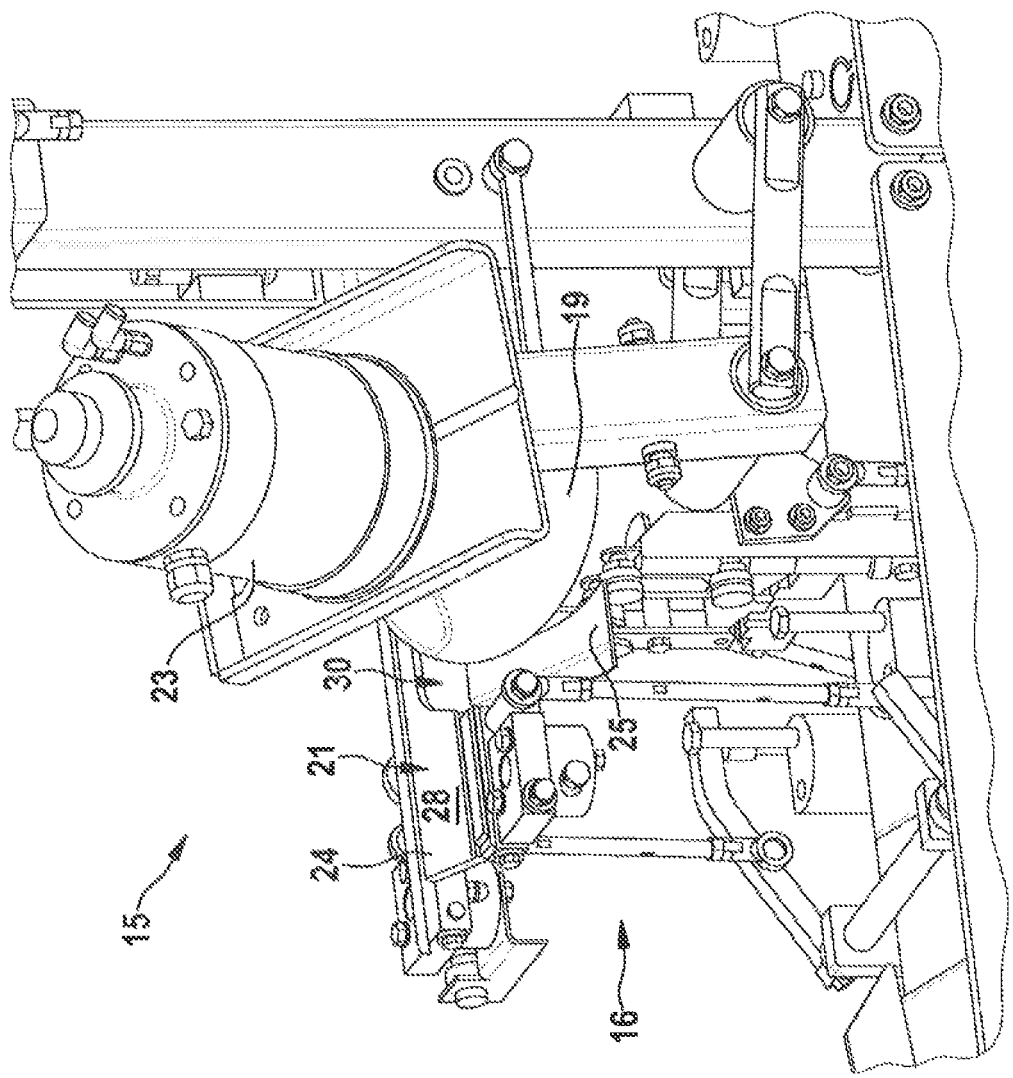
Figure 4:
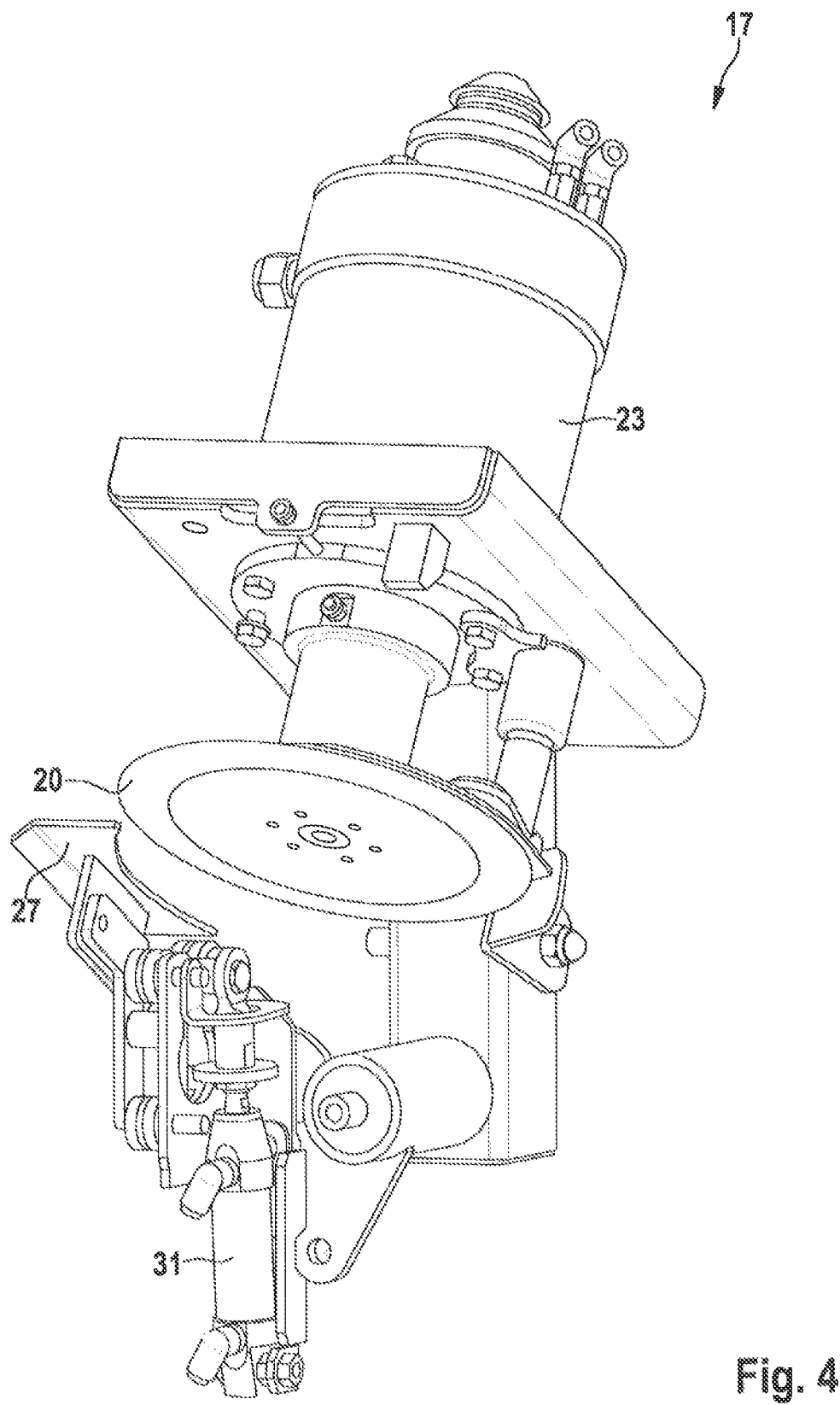
Figure 5:
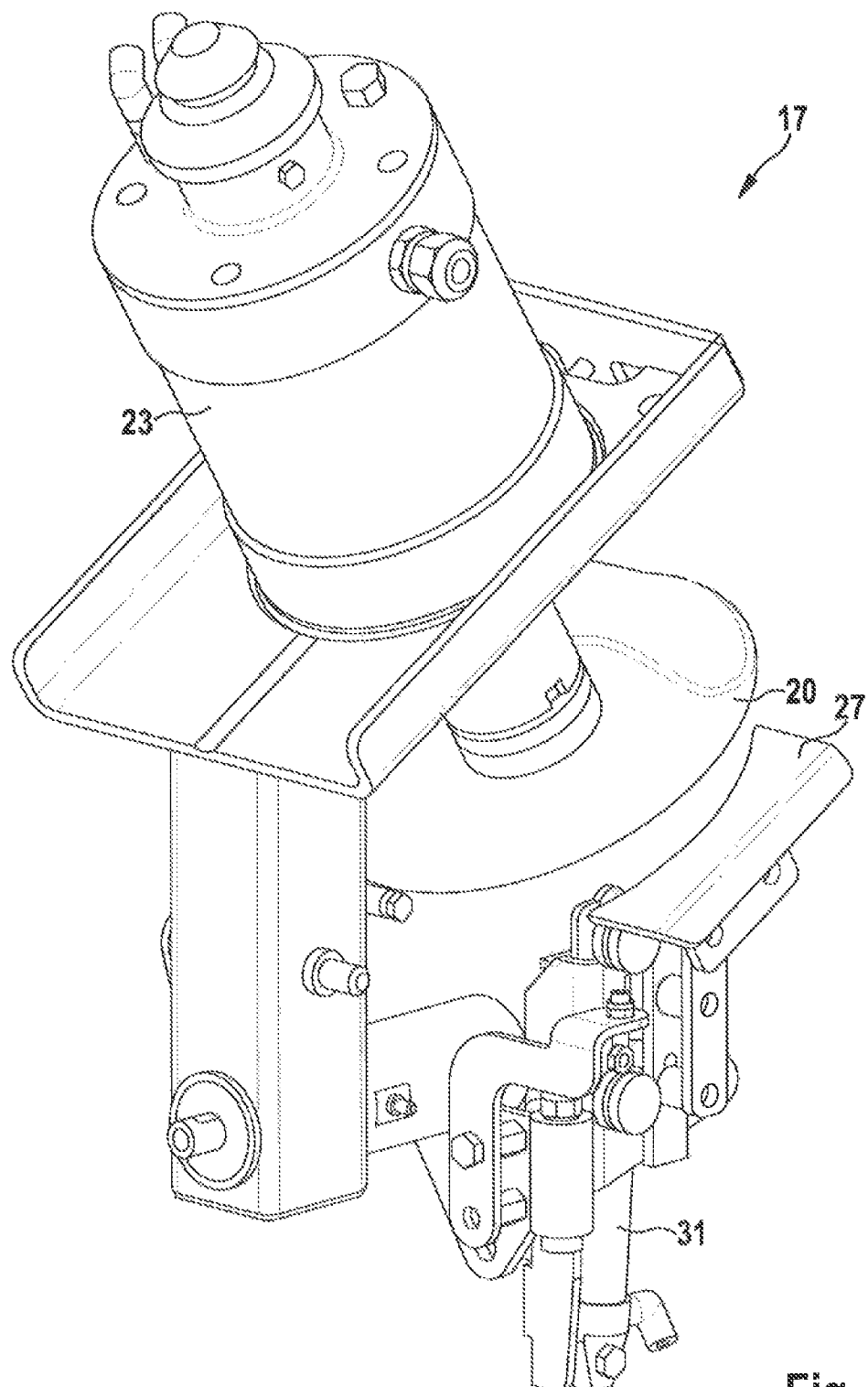
Figure 6:
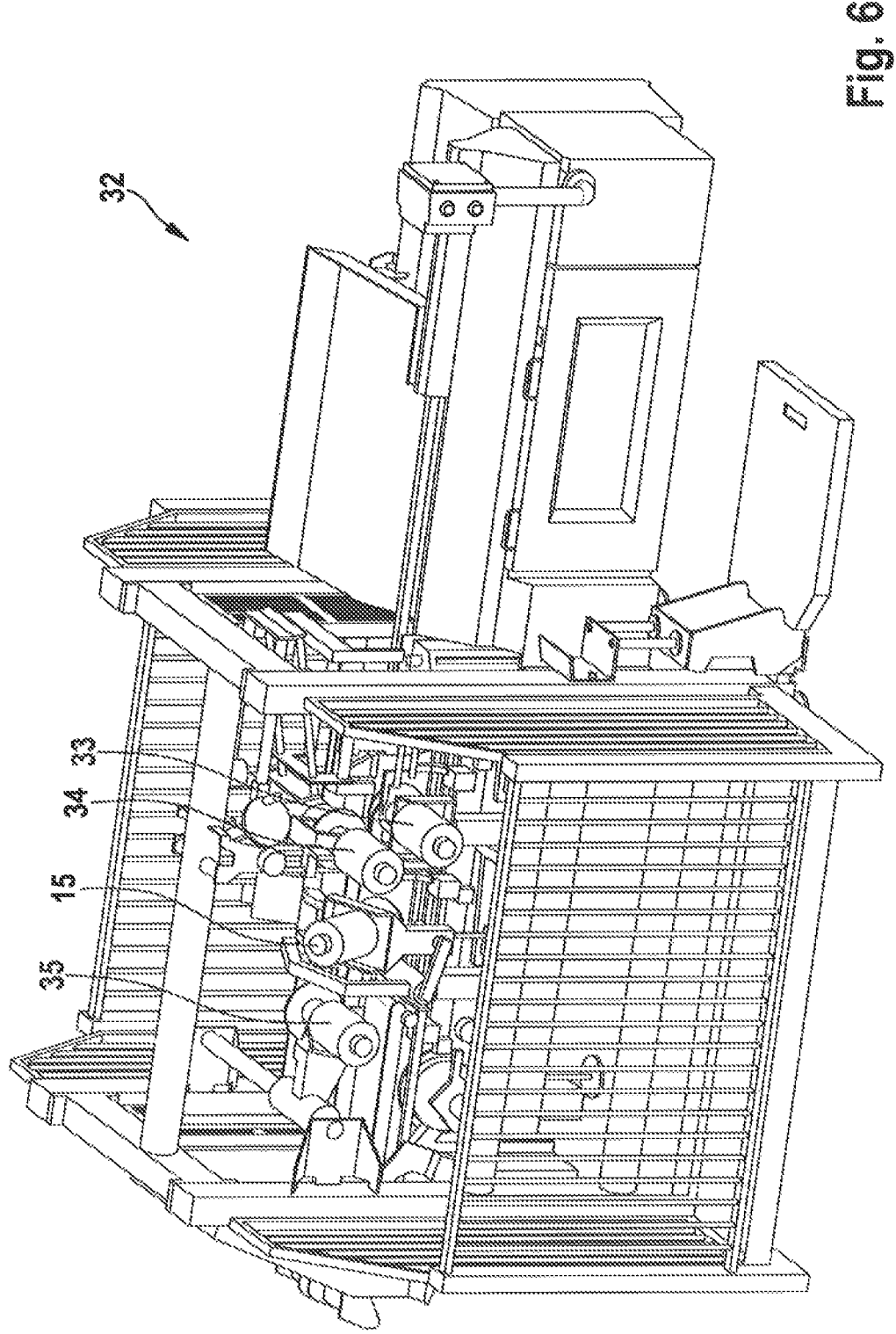

Further expedient and/or advantageous features and developments of the apparatus for flank cutting and the filleting apparatus on the one hand, and the method on the other hand emerge from the dependent claims and the description. Especially preferred embodiments of the apparatuses and the principle of the method are explained in greater detail with reference to the attached drawing. The drawing shows:

FIG. 1 a diagrammatic and partial representation of the apparatus for flank cutting with flank knife units in the standby position and the counter-surface arrangement in a first (supporting) position, FIG. 2 the apparatus according to FIG. 1 with the flank knife units in the standby position, the transport saddle being in a position advanced in transport direction T, and the counter-surface arrangement being in a second (supporting and uncovering) position in which a counter-surface element is in a position increasing the cutting gap, FIG. 3 a further view of the apparatus for flank cutting according to FIG. 2, FIG. 4 a diagrammatic and partial representation of a flank knife unit, FIG. 5 a further view of the flank knife unit according to FIG. 4, FIG. 6 a diagrammatic representation of a filleting apparatus with an apparatus for flank cutting according to FIGS. 1 to 5, and FIG. 7 a diagrammatic representation of the knife assemblies of the filleting apparatus according to FIG. 6.

The apparatus 10 illustrated in the drawing is used for cutting fish fillets from flank bones, More precisely, this apparatus 10 is designed and configured for processing headed fish 11, namely for cutting the fish fillets of the fish, which preferably have already been processed by a ventral knife assembly and a dorsal knife assembly, from the flank bones. The apparatus 10 comprises a conveying apparatus 12, designed and configured to transport the fish 11 tail-first in transport direction T, the conveying apparatus 12 having an endlessly circulating transport conveyor 13 with at least one transport saddle 14 for receiving and securing a fish 11. The apparatus 10 further comprises a flank knife assembly 15, the flank knife assembly 15 having two flank knife units 16, 17, opposing each other on both sides of the transport conveyor 13 in the region of a transport saddle guide 18, and each flank knife unit 16, 17 comprising a rotatably drivable circular knife 19, 20 as well as a counter-surface arrangement 21, 22 for the circular knife 19, 20, the circular knife 19, 20 being arranged at a distance from the counter-surface arrangement 21, 22 to form a cutting gap S, as well as at least one control device (not explicitly illustrated) for controlling the flank knife units 16, 17 relative to the transport conveyor 13 from a standby position into a working position and back. In the standby position, the cutting edges of the circular knives 19, 20 are at least partially covered by the transport saddle guide 18. To move the circular knives 19, 20 into their working position, they are steered upwards in such a manner that the cutting edges of the circular knives 19, 20 are exposed above the transport saddle guide 18.

This apparatus 10 is characterised according to the invention in that the counter-surface arrangements 21, 22 are designed and configured to vary the size of the cutting gap S controllably during the processing operation. This means that, in addition to setting the size of the cutting gap S before or after the processing operation, i.e. during the standstill phase of the apparatus 10, in order to determine the cutting thickness on the one hand and to determine the appropriate time for engagement of the circular knives 19, 20 in the fish 11 on the other hand, adjustment of the size of the cutting gap S is ensured during processing or cutting the fish fillets from the flank bones. As a result, an individual incision can be achieved by varying the size of the cutting gap S preferably for each fish 11 and in particular for each position of the circular knives 19, 20 in the fish. In other words, the movement of the counter-surface arrangements 21, 22 downwards, i.e. away from the circular knife 19, 20, to increase the cutting gap S, creates space which is required so that the belly flaps with the ventral fins run under the circular knives 19, 20 or can be guided along below the circular knives 19, 20 so that these remain on the skeleton.

When taken on their own or in combination with each other, the features and developments described below illustrate preferred embodiments. It is expressly pointed out that features which are summarised in the claims and/or the description and/or the drawing or are described in a common embodiment can also further develop the apparatus 10 described above in a functionally independent manner.

The transport conveyor 13 preferably comprises a plurality of transport saddles 14. Using the transport saddles 14, the headed fish 11 are transported along a transport path or processing path into and through the operating area of the flank knife assembly 15. The conveying apparatus 12 or the transport conveyor 13 can be driven continuously or clocked. The or each transport saddle 14 is preferably detachably arranged on an endlessly circulating transport chain or the like as transport conveyor 13. The two circular knives 19, 20 are preferably inclined to each other and aligned with the transport saddle guide 18. More precisely, the circular knives 19, 20 preferably drop outwards and obliquely downwards starting from the transport saddle guide 18. The angle of inclination of the circular knives 19, 20—in relation to the transport saddle guide 18—is preferably adjustable. Each circular knife 19, 20 can have its own drive 23. Alternatively, it is also possible for the circular knives 19, 20 to be driven via a common drive. The two counter-surface arrangements 21, 22 associated with the circular knives 19, 20 can be configured separately or coupled with each other. The cutting gap S is formed—at least during the processing or cutting operation—between the circular knives 19, 20 and the respectively associated counter-surface arrangements 21, 22. The size of the cutting gap S is adjustable.

The counter-surface arrangements 21, 22 are preferably associated with at least one control device for moving the counter-surface arrangement 21, 22 relative to the circular knife 19, 20 in such a manner that the counter-surface arrangements 21, 22 are designed to be movable, at least section by section, relative to the respective circular knife 19, 20 of the flank knife units 16, 17 for varying the size of the cutting gap S during the processing operation. By means of the control device, the counter-surface arrangements 21, 22 can be specifically moved away from or towards the circular knife 19, 20. The control device can optionally be designed mechanically and/or electrically. In a first embodiment, each counter-surface arrangement 21, 22 is associated with a separate control device. In a further embodiment, a common control device is provided for both counter-surface arrangements 21, 22. The counter-surface arrangements 21, 22 can be moved up and down completely or partially or section by section relative to the circular knife 19, 20 by the or each control device.

Each of the counter-surface arrangements 21, 22 can be formed in one piece. However, each counter-surface arrangement 21, 22 preferably comprises at least two separate counter-surface elements 24, 25; 26, 27, of which a first counter-surface element 24, 26 is arranged on the flank knife unit 16, 17 at a fixed gap distance SA1 from the circular knife 19, 20, forming a cutting gap S, and movable against a spring force, and the second counter-surface element 25, 27 is arranged on the flank knife unit 16, 17 so as to be separately controllable and movable towards the circular knife 19, 20 and away from the circular knife 19, 20 for varying the size of a gap distance SA2, forming a cutting gap S. In this connection, fixed means that the first counter-surface elements 24, 26 are not actively controllable but are merely arranged on the flank knife units 16, 17 yieldingly against the spring force exerted by the fish 11 itself. For this purpose, the first counter-surface element 24, 26 is preferably pivotably mounted about an axis of rotation D. Instead of a spring for applying the spring force, pressure cylinders or the like can also be provided for applying a holding force. Optionally, the first counter-surface elements 24, 26 can also be actively controllable.

The first counter-surf-ace element 24, 26 in each case has a substantially rectangular support surface 28, 29, a corner region of the support surface 28, 29 being recessed in a region of the first counter-surface element 24, 26, which is at the rear in transport direction T, on the side directed away from the transport conveyor 13, in order to form a recess 30. As a result, the support surface 28, 29 has a shape similar to a "meat cleaver". The support surface 28, 29 serves primarily to support the ends of the bones (vertebral processes) of the ventral bones of the fish 11. The basic shape of the support surfaces 28, 29 can vary as long as the ends of the bones receive sufficient support and a partial region of the support surfaces 28, 29 on the sides directed towards the circular knives 19, 20 is recessed.

The second counter-surface element 25, 27 in each case has a substantially crescent or half-moon shape and is arranged in the region of this recess 30. This means that the second counter-surface element 25, 27 is generally in an upper position in which the gap distance $S_{A1}$ between the first counter-surface element 24, 26 and the circular knife 19, 20 on the one hand and the gap distance $S_{A2}$ between the second counter-surface element 25, 27 and the circular knife 19, 20 on the other hand is approximately equal in size (see FIG. 1 for example). The second counter-surface element 25, 27 can be moved from this upper position into a lower position (see FIG. 2 for example) in which the gap distance $S_{A1}$ between the first counter-surface element 24, 26 and the circular knife 19, 20 is smaller than the gap distance $S_{A2}$ between the second counter-surface element 25, 27 and the circular knife 19, 20. In other words, sufficient space is created in the lower position of the second counter-surface element 25, 27 so that the free end of the belly flap with the ventral fins can be guided along below the circular knives 19, 20. The basic shape of the second counter-surface element 25, 27 is also variable. This means that the second counter-surface elements 25, 27 can also have a different shape than the crescent shape as long as the supporting function in the upper position is ensured on the one hand and a relative movement to the first counter-surface element 24, 26 can be realised collision-free on the other hand.

In a first embodiment, each flank knife unit 16, 17 is associated with a cam control, by means of which the flank knife units 16, 17 can be moved from the standby position into the working position and vice versa. The back and forth or up and down movement of the flank knife units 16, 17, i.e. the adjustment of the position of the flank knife units 16, 17, can be performed by a common cam control for both flank knife units 16, 17. Optionally, each flank knife unit 16, 17 can also be associated with a separate cam control. Accordingly, each counter-surface arrangement 21, 22 can also be associated with a separate cam control, by means of which the counter-surface arrangement 21, 22 can be moved, at least section by section, relative to the circular knife 19, 20, it being possible to superimpose the movements of the flank knife units 16, 17 and the counter-surface arrangements 21, 22 on each other. Optionally, the counter-surface arrangements 21, 22 can also be associated with a common cam control. In the event that the counter-surface arrangements 21, 22 are formed in at least two parts, the second counter-surface element 25, 27 is associated with a cam control in such a manner that the second counter-surface element 25, 27 can be moved, in particular can be pivoted, from a first position, in which the second counter-surface element 25, 27 substantially fills the recess 30 of the first counter-surface element 24, 26 and the sizes of the cutting gaps S or the gap distances $S_{A1}$ between the first counter-surface element 24, 26 and the circular knife 19, 20 and $S_{A2}$ between the second counter-surface element 25, 27 and the circular knife 19, 20 are substantially identical, into a second position, in which the second counter-surface element 25, 27 uncovers the recess 30 of the first counter-surface element 24, 26 and increases the cutting gap S or the gap distance $S_{A2}$ between the second counter-surface element 25, 27 and the circular knife 19, 20, and vice versa.

In a further especially preferred embodiment of the apparatus 10, each flank knife unit 16, 17 is again associated with a cam control, as already described above in connection with the first embodiment, by means of which the flank knife units 16, 17 can be moved from the standby position into the working position and vice versa. In this embodiment, however, the or each counter-surface arrangement 21, 22 is associated with an electrically controllable drive means, using which the counter-surface arrangement 21, 22 can be moved, at least section by section, relative to the circular knife 19, 20, it being possible to superimpose the movements of the flank knife units 16, 17 and the counter-surface arrangements 21, 22 on each other.

Advantageously, the second counter-surface element 25, 27 is associated with a pneumatic cylinder 31 in such a manner that the second counter-surface element 25, 27 can be moved, in particular can be moved linearly, from a first position, in which the second counter-surface element 25, 27 substantially fills the recess 30 of the first counter-surface element 24, 26 and the sizes of the cutting gaps S or gap distances $S_{A1}$ between the first counter-surface element 24, 26 and the circular knife 19, 20 and $S_{A2}$ between the second counter-surface element 25, 27 and the circular knife 19, 20 are substantially identical, into a second position, in which the second counter-surface element 25, 27 uncovers the recess 30 of the first counter-surface element 24, 26 and increases the cutting gap S or the gap distance $S_{A2}$ between the second counter-surface element 25, 27 and the circular knife 19, 20, and vice versa, the pneumatic cylinder 31 being connected to a control device. For example, electric cables or the like can be provided for controlling, for example, valves of a compressed air supply for the pneumatic cylinder 31.

It is basically possible to implement a pivoting movement of the second counter-surface element 25, 27. However, the second counter-surface elements 25, 27 are preferably designed and configured to perform a linear movement initiated by the pneumatic cylinder 31. It is possible that a common pneumatic cylinder 31 is provided for the two counter-surface elements 25, 27. Preferably, however, the second counter-surface element 25, 27 is associated with a separate pneumatic cylinder 31. Other electrically controllable adjusting elements can also be used instead of the pneumatic cylinder 31.

The apparatus 10 can have a plurality of control devices which are controlled by means of a higher-level control device. However, the apparatus 10 can also have a single central control device by means of which the individual components of the apparatus 10, which are controllable, are controlled.

In a further embodiment, both the counter-surface arrangements 21, 22 and the flank knife units 16, 17 can be associated with electrically controllable drive means for adjusting the positions, the drive means being connected to a control device via electrical connections. As positions, the standby position and working position of the flank knife units 16, 17—relative to the transport saddle guide—and the different positions of the counter-surface arrangements 21, 22 or the second counter-surface elements 25, 27 relative to the circular knife 19, 20 should be mentioned in particular.

Optionally, the or each control device can include at least one control program, by means of which the flank knife units 16, 17 can be moved during the processing operation between their positions and/or each counter-surface arrangement 21, 22 or second counter-surface elements 25, 27 thereof can be moved during the processing operation, away from the circular knife for increasing the gap distance $S_{A2}$ from the circular knife 19, 20, which forms the cutting gap S, and towards the circular knife for decreasing the gap distance $S_{A2}$ from the circular knife 19, 20.

In a further optional embodiment, monitoring means—preferably optical—which are directed at the region of the counter-surface arrangements 21, 22 and the circular knives 19, 20 can also be provided. The monitoring means can also be connected to a or the control device so that the information determined, e.g. the location/position of the fish 11 in relation to the circular knife 19, 20 and/or to the counter-surface arrangement 21, 22, can be used in particular to control the second counter-surface elements 25, 27.

The apparatus 10 for flank cutting can be designed as a separate apparatus or also as a retrofit kit. However, the apparatus 10 for flank cutting is preferably part of a filleting apparatus 32 (see FIG. 6 for example). The filleting apparatus 32 is designed and configured for completely separating the fish fillets from headed fish 11. The filleting apparatus 32 comprises an apparatus 10 according to one or more of claims 1 to 10, as previously described in detail, a ventral knife assembly 33 for processing the ventral side of the headed fish 11 from the tail to the beginning of the abdominal cavity of the fish 11 or up to the head incision, as well as a dorsal knife assembly 34 for processing the dorsal side of the headed fish 11 over their entire length, the ventral knife assembly 33 and the dorsal knife assembly 34 each being arranged upstream of the flank knife assembly 15 of the apparatus 10 in transport direction T, and a separating assembly 35 for completely separating the fish fillets from the skeleton of the headed fish 11, the separating assembly 35 being arranged downstream of the flank knife assembly 15 in transport direction T, as well as a control device for controlling the filleting apparatus 32.

The arrangement of the assemblies is explained in principle with reference to FIG. 7. In transport direction T of the fish 11, the fish initially meet the ventral knife assembly 33 and the dorsal knife assembly 34. The order in which the ventral knife assembly 33 and dorsal knife assembly 34 are arranged can vary. Preferably, the circular knives of the ventral knife assembly 33 are driven anti-clockwise for a transport direction T from right to left (as in the view shown in FIG. 7). The circular knives of the dorsal knife assembly 34 are preferably driven in the clockwise direction. The flank knife assembly 15, the circular knife 20 of which is preferably driven in the clockwise direction, is arranged in transport direction T downstream of the ventral knife assembly 33 and the dorsal knife assembly 34. The opposing circular knife 19 has an opposing direction of rotation. The separating assembly 35, the separating knives, preferably circular knives, of which are preferably driven in the clockwise direction, is arranged in transport direction T downstream of the flank knife assembly 15.

The control device of the filleting apparatus 32 can also be designed and configured to control all components of the apparatus 10 and in particular can also include corresponding control programs. The or each control device can also be connected to an intranet or an external network.

The method is explained in greater detail below with reference to the drawing: Many fish species have ventral fins arranged in pairs in the ventral region, the so-called pelvic fins. After the fish 11 have been headed, they are placed directly or with opened and/or gutted abdominal cavity onto a transport saddle 14 of a conveying apparatus 12. The flank bones of the skeleton, to which and on which the belly flaps consisting of flesh and skin are attached (in the sense of grown on), extend on both sides of the transport saddle 14. The ventral fins are located at a substantially constant distance from the anus which is located in the region of the tail-side end of the abdominal cavity.

The method is used for processing headed fish 11, namely for cutting the fish fillets of the fish 11, which preferably have already been processed by a ventral knife assembly 33 and a dorsal knife assembly 34, from the flank bones. Firstly, a conveying apparatus 12 comprising a transport conveyor 13 feeds the headed fish 11 tail-first along a transport path in transport direction T into the region of a flank knife assembly 15. The flank knife assembly 15 comprises two flank knife units 16, 17 which are situated on opposing sides of the transport conveyor 13. The flank knife units 16, 17 are moved relative to the transport conveyor 13 from a standby position into a working position when the fish 11 reach the region of the flank knife units 16, 17 with the leading end of their abdominal cavity. The fish fillets are cut from the flank bones on both sides of the transport path when the fish 11 arrive in the operating area of the flank knife units 16, 17, The flank bones are guided through a cutting gap S formed between a rotatably drivable circular knife 19, 20 and a counter-surface arrangement 21, 22 of the flank knife units 16, 17.

According to the invention, the counter-surface arrangements 21, 22 are lowered at least section by section for temporarily increasing the cutting gap S during cutting of the fish fillets from the flank bones, and are then raised again.

Advantageously, the counter-surface arrangements 21, 22 each comprise two counter-surface elements 24, 25; 26, 27, first counter-surface elements 24, 26 of both counter-surface arrangements 21, 22 forming a fixed gap distance $S_{A1}$ from the circular knife 19, 20, and second counter-surface elements 25, 27 of both counter-surface arrangements 21, 22 being separately controlled in such a manner that the gap distance $S_{A2}$ from the circular knife 19, 20 varies and in particular increases when the fish 11 reach the circular knives 19, 20 of the flank knife units 16, 17 with their ventral fins.

The beginning of flank cutting is "signalled" by the leading tip of the transport saddle 14. In other words, the tip of the transport saddle 14 is the significant point for the beginning of flank cutting. This means that the flank knife units 16, 17 are moved upwards out of their standby position into their working position when the tip of the transport saddle 14 arrives in the region of the circular knives 19, 20. As a result, the circular knives 19, 20 dip between the flank bones and the flesh of the fish fillet, from inside and below as it were, so that the flank bones slide along below the circular knife 19, 20 and the flesh with the skin (i.e. the fish fillets or belly flaps) slide along above the circular knives 19, 20. When the fish 11 reaches the region of the circular knives 19, 20 with its ventral fins, the ventral fins are separated from the fish fillet, on the one hand by the exposed cutting edges of the circular knives 19, 20 located in their working position, and on the other hand by lowering of the counter-surface arrangement 21, 22 or the second counter-surface element 25, 27 of the counter-surface arrangements 21, 22. Lowering of the second counter-surface element 25, 27 creates spaces which the spatial extension of the ventral fins requires in order to run under the circular knives 19, 20 in the region of the flank bones.

The path or distance from the anus to the ventral fins ("pelvic fins") is substantially constant, regardless of the size of the fish 11 to be processed. Knowing the distance, the control device can be used to determine when the counter-surface arrangements 21, 22 or individual elements thereof must be controlled, i.e. moved downwards, to establish a greater distance and when the counter-surface arrangements 21, 22 or individual elements thereof must be controlled, i.e. moved upwards, to establish the original distance. The original distance is the cutting gap S, at which the gap distances $S_{A1}$ between the first counter-surface elements 24, 26 and the circular knives 19, 20 and $S_{A2}$ between the second counter-surface elements 25, 27 and the circular knives 19, 20 are substantially identical. Deviating from this, the gap distance $S_{A2}$ between the second counter-surface elements 25, 27 and the circular knives 19, 20 is temporarily increased.

With the method according to the invention it is thus achieved that the fish fillets or belly flaps are guided along the circular knives 19, 20 in variable orientation according to the transport progress, i.e. on the one hand resting completely on the counter-surface elements 24, 25, 26, 27 and on the other hand at least partially suspended from the counter-surface element 24, 26, in order to achieve an individual incision which omits the ventral fins.

Preferably, the fish 11 are processed by means of a ventral knife assembly 33 and a dorsal knife assembly 34 before flank cutting and are detached completely from the skeleton by means of a separating assembly 36 after flank cutting. To do this, two circular knives of the ventral knife assembly 33 cut from the tail root to the abdominal cavity, freeing lower ray bones of the skeleton extending up to the backbone/central bone and then insert into the abdominal cavity. Two circular knives of the dorsal knife assembly 34 cut from the tail root over the entire length of the fish, freeing upper ray bones of the skeleton up to the backbone. The two circular knives 19, 20 of the flank knife assembly 15 cut the two fish fillets from the flank bones on both sides (right and left). Two separating knives of the separating assembly 35 are used to cut the fish fillets from the backbone on both sides (right and left) from the tail root up to the flank bones.

Especially preferably, this method is carried out with a filleting apparatus 32 according to claim 11 which is described above.

The invention claimed is:

1. A processing apparatus designed and configured for processing headed fish that have already been processed by a ventral knife assembly and a dorsal knife assembly, from the flank bones, comprising:
a conveying apparatus, designed and configured for transporting the fish tail-first in transport direction, wherein the conveying apparatus has an endlessly circulating transport conveyor with at least one transport saddle for receiving and securing a fish;
a flank knife assembly, wherein the flank knife assembly has two flank knife units, opposing each other on both sides of the transport conveyor in a region of a transport saddle guide, and each flank knife unit comprises a rotatably drivable circular knife and a counter-surface arrangement for the circular knife, wherein the circular knife is arranged at a distance from the counter-surface arrangement to form a cutting gap; and
at least one control device for moving the flank knife units relative to the transport conveyor from a standby position into a working position and back,
wherein the counter-surface arrangements are designed and configured to vary a size of the cutting gap S controllably during the processing.

2. The processing apparatus according to claim 1, wherein the counter-surface arrangements are associated with the at least one control device for moving the counter-surface arrangement relative to the circular knife in such a manner that the counter-surface arrangements are designed to be movable, at least section by section, relative to a respective circular knife of the flank knife units for varying the size of the cutting gap S during the processing.

3. The processing apparatus according to claim 1, wherein each counter-surface arrangement comprises at least two separate counter-surface elements, of which a first counter-surface element is arranged on the flank knife unit at a fixed first gap distance from the circular knife, forming a first cutting gap, and movable against a spring force, and the second counter-surface element is arranged on the flank knife unit so as to be separately controllable and movable towards the circular knife and away from the circular knife for varying a size of a second gap distance, forming a second cutting gap.

4. The processing apparatus according to claim 3, wherein the first counter-surface element has a substantially rectangular support surface, wherein a corner region of the support surface is recessed in a region of the first counter-surface element, which is at a rear in the transport direction, on a side directed away from the transport conveyor in order to form a recess, and in that the second counter-surface element is substantially crescent-shaped and arranged in a region of the recess.

5. The processing apparatus according to claim 3, wherein the second counter-surface element is associated with a cam control in such a manner that the second counter-surface element is moved from a first position, in which the second counter-surface element substantially fills the recess of the first counter-surface element and the size of the first cutting gap between the first counter-surface element and the circular knife and the size of the second cutting gap between the second counter-surface element and the circular knife are substantially identical, into a second position, in which the second counter-surface element uncovers the recess of the first counter-surface element and increases the second cutting gap between the second counter-surface element and the circular knife, and vice versa.

6. The processing apparatus according to claim 5, wherein the second counter-surface element is pivoted from the first position into the second position.

7. The processing apparatus according to claim 3, wherein the second counter-surface element is associated with a pneumatic cylinder in such a manner that the second counter-surface element is moved from a first position, in which the second counter-surface element substantially fills the recess of the first counter-surface element and the size of the first cutting gap between the first counter-surface element and the circular knife and the size of the second cutting gap between the second counter-surface element and the circular knife are substantially identical, into a second position, in which the second counter-surface element uncovers the recess of the first counter-surface element and increases the second cutting gap S between the second counter-surface element and the circular knife, and vice versa, wherein the pneumatic cylinder is connected to the control device.

8. The processing apparatus according to claim 7, wherein the control device includes at least one control program, by which the flank knife units are moved during the processing between their positions and/or each counter-surface arrangement or counter-surface elements thereof are moved during the processing operation, away from the circular knife for increasing the second gap distance from the circular knife, which forms the second cutting gap, and towards the circular knife for decreasing the second gap distance from the circular knife.

9. The processing apparatus according to claim 7, wherein the second counter-surface element is moved linearly from the first position into the second position.

10. The processing apparatus according to claim 1, wherein each flank knife unit is associated with a cam control, by which the flank knife units can be moved from the standby position into the working position and vice versa, and in that each counter-surface arrangement is associated with the cam control, by which the counter-surface arrangement is moved, at least section by section, relative to the circular knife, and wherein the movements of the flank knife units and the counter-surface arrangements are superimposed on each other.

11. The processing apparatus according to claim 1, wherein each flank knife unit is associated with a cam control, by which the flank knife units are moved from the standby position into the working position and vice versa, and in that each counter-surface arrangement is associated with an electrically controllable drive, via which the counter-surface arrangement is moved, at least section by section, relative to the circular knife, wherein the movements of the flank knife units and the counter-surface arrangements are superimposed on each other.

12. The processing apparatus according to claim 1, wherein both the counter-surface arrangements and the flank knife units are associated with an electrically controllable drive for adjusting the position, wherein the drive is connected to the control device via electrical connections.

13. The processing apparatus according to claim 1, wherein the processing of the headed fish comprises cutting the fish fillets of the fish.

14. A filleting apparatus, designed and configured for completely separating the fish fillets from headed fish, the filleting apparatus comprising:
the processing apparatus according to claim 1;
a ventral knife assembly for processing a ventral side of the headed fish from the tail to the anus region of the fish;
a dorsal knife assembly for processing a dorsal side of the headed fish over an entire length, wherein the ventral knife assembly and the dorsal knife assembly are each arranged upstream of the flank knife assembly of the processing apparatus in the transport direction, and
a separating assembly for completely separating the fish fillets from the skeleton of the headed fish,
wherein the separating assembly is arranged downstream of the flank knife assembly in the transport direction; and
a control device for controlling the filleting apparatus.

15. A method for processing headed fish that have already been processed by a ventral knife assembly and a dorsal knife assembly, from the flank bones, comprising:
Feeding headed fish tail-first by a conveying apparatus comprising a transport conveyor along a transport path in a transport direction into a region of a flank knife assembly, wherein the flank knife assembly comprises two flank knife units that are situated on opposing sides of the transport conveyor,
Moving the flank knife units relative to the transport conveyor from a standby position into a working position when the fish reach a region of the flank knife units with the leading end of an abdominal cavity,
Cutting the fish fillets from the flank bones on both sides of the transport path by one flank knife unit in each case,
wherein the flank bones are guided through a cutting gap formed between a rotatably drivable circular knife and a counter-surface arrangement of the flank knife units,
wherein the counter-surface arrangements are lowered at least section by section for temporarily increasing the cutting gap during the cutting of the fish fillets from the flank bones and are then raised again.

16. The method according to claim 15, wherein the counter-surface arrangements each comprise two counter-surface elements wherein first counter-surface elements of both counter-surface arrangements form a fixed first gap distance from the circular knife, and second counter-surface elements of both counter-surface arrangements are separately controlled in such a manner that a second gap distance from the circular knife varies and increases when the fish reach the circular knives of the flank knife units with their ventral fins.

17. The method according to claim 15, wherein the fish are processed by a ventral knife assembly and a dorsal knife assembly before flank cutting, and wherein the fish are detached completely from the skeleton by a separating assembly after flank cutting.

18. The method according to claim 15, wherein said method is carried out with a filleting apparatus comprising a conveying apparatus, designed and configured for transporting the fish tail-first in transport direction, wherein the conveying apparatus has an endlessly circulating transport conveyor with at least one transport saddle for receiving and securing a fish; a flank knife assembly, wherein the flank knife assembly has two flank knife units, opposing each other on both sides of the transport conveyor in a region of a transport saddle guide, and each flank knife unit comprises a rotatably drivable circular knife and a counter-surface arrangement for the circular knife, wherein the circular knife is arranged at a distance from the counter-surface arrangement to form a cutting gap; and at least one control device for moving the flank knife units relative to the transport conveyor from a standby position into a working position and back, wherein the counter-surface arrangements are designed and configured to vary a size of the cutting gap S controllably during the processing;

a ventral knife assembly for processing the ventral side of the headed fish from the tail to the anus region of the fish;

a dorsal knife assembly for processing the dorsal side of the headed fish over the entire length, wherein the ventral knife assembly and the dorsal knife assembly are each arranged upstream of the flank knife assembly of the apparatus in the transport direction, and a separating assembly for completely separating the fish fillets from the skeleton of the headed fish, wherein the separating assembly is arranged downstream of the flank knife assembly in the transport direction, and a control device for controlling the filleting apparatus.

19. The method according to claim 15, wherein the processing of the headed fish comprises cutting the fish fillets of the fish.

* * * * *